United States Patent
Marotta et al.

(10) Patent No.: US 8,325,497 B2
(45) Date of Patent: Dec. 4, 2012

(54) HIGH VOLTAGE SYNCHRONOUS RECTIFIER CONTROLLER

(75) Inventors: Joseph Marotta, Boonton, NJ (US);
Xavier Enriquez, Glendale, AZ (US);
Stanislav Suchovsky, Trencin (SK);
Steven Lawson, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 290 days.

(21) Appl. No.: 12/795,271

(22) Filed: Jun. 7, 2010

(65) Prior Publication Data

US 2011/0298434 A1     Dec. 8, 2011

(51) Int. Cl.
*H02M 3/335* (2006.01)
(52) U.S. Cl. ............ 363/18; 363/21.12; 363/21.14; 363/21.18; 323/282; 323/283
(58) Field of Classification Search .......... 363/21.06, 363/21.1, 21.14, 21.18, 86, 87, 88, 18, 21.12; 323/222, 282, 283
See application file for complete search history.

(56) References Cited

U.S. PATENT DOCUMENTS

| | | | | |
|---|---|---|---|---|
| 4,870,555 A | * | 9/1989 | White | 363/21.06 |
| 5,742,491 A | * | 4/1998 | Bowman et al. | 363/21.06 |
| 5,818,705 A | * | 10/1998 | Faulk | 363/48 |
| 6,026,005 A | | 2/2000 | Abdoulin | |
| 6,101,104 A | * | 8/2000 | Eng | 363/21.06 |
| 6,351,403 B2 | | 2/2002 | Abdoulin | |
| 6,407,793 B1 | | 6/2002 | Liang et al. | |
| 6,961,253 B1 | | 11/2005 | Cohen | |
| 7,321,498 B2 | | 1/2008 | Cebry | |

* cited by examiner

*Primary Examiner* — Nguyen Tran
(74) *Attorney, Agent, or Firm* — Shimokaji & Assoc., PC

(57) ABSTRACT

A power supply may comprise a pulse-width-modulation (PWM) controller; a synchronous rectifier having a forward metal oxide field effect transistor (MOSFET) and a catch MOSFET; a forward gate driver; a catch gate driver; and the PWM controller connected so that a low output of the PWM controller facilitates operation of the catch MOSFET and so that the low output precludes operation of the forward MOSFET. The power supply may include a self powered synchronous rectifier that may be constructed with delay times that are independent of lot-to-lot and temperature-related timing variations of MOSFETS.

12 Claims, 4 Drawing Sheets

HIGH VOLTAGE SYNCHRONOUS RECTIFIER CONTROLLER

BACKGROUND OF THE INVENTION

The present invention generally relates to electrical power supplies, and more particularly, to power supplies that employ synchronous rectification.

In flyback and forward switching power supplies, output rectifier power dissipation may be a substantial contributor to the efficiency of a power supply. Synchronous rectification, performed with metal oxide field effect transistors (MOSFETS), may reduce the power dissipation of the rectifier and improve efficiency. As compared with diode rectification, synchronous rectification may also allow a power converter of the power supply to operate at small load currents with lower output ripple voltage because a "dead region" of the diodes may be eliminated. The challenge of synchronous rectifier circuits is to provide the correct timing between a catch MOSFET and a forward MOSFET. Small changes in timing may significantly change the efficiency of the power supply. If gate drives are active simultaneously, cross conduction will occur. If the gate drive timing is too slow, the advantage of synchronous rectification is reduced because a body diode and/or a parallel diode may conduct and dissipate power.

Consequently, many synchronous rectifiers are constructed so that a time delay between operations of the MOSFETS is made low, but not so low as to increase the risk of cross conduction. In this context, it is important to be mindful of the temperature range in which the rectifier may operate, because MOSFETS, due to their inherent parasitic capacitance, may exhibit variations in timing as a function of their temperature. In other words, a particular MOSFET may exhibit a first response time to a gate driver at a low temperature and a different response time to the gate driver at a high temperature. These potential temperature-related response time variations may be significant in rectifiers which may be exposed to wide temperature ranges. For example, a rectifier in an aircraft at ground level may be at a temperature as high as 120° F. The same rectifier may be exposed to temperature as low as −70° F. when the aircraft is in flight.

Additionally, a particular manufactured lot of MOSFETS may exhibit timing characteristics which may be different from timing characteristics of a different lot of MOSFETS. In other words MOSFETS may exhibit lot-to-lot timing variations when incorporated in synchronous rectifiers.

Conventional synchronous rectifiers are constructed with the timing of the gate drivers established so that lot-to-lot variations and temperature-related variations of response time of the MOSFETS do not allow cross conduction to occur. For example, if it is empirically determined that a particular type of MOSFET may have a range of possible lot-to-lot and temperature-related response time variations of up to T nanoseconds (ns) for a temperature range between +120° F. and −70° F., then a rectifier constructed to operate within those temperature limits may incorporate an extra delay time of T ns or more to assure that cross conduction does not occur. This extra delay time has the effect of reducing the overall efficiency of the rectifier.

As can be seen, there is a need for a power supply with a self powered synchronous rectifier that may be constructed with delay times that are independent of lot-to-lot and temperature-related timing variations of MOSFETS.

SUMMARY OF THE INVENTION

In one aspect of the present invention, a power supply may comprise a pulse-width-modulation (PWM) synchronous drive circuit; a synchronous rectifier having a forward metal oxide field effect transistor (MOSFET) and a catch MOSFET; a forward MOSFET gate driver; a catch MOSFET gate driver; and the PWM controller connected so that a low output of the PWM controller facilitates operation of the catch MOSFET and so that the low output precludes operation of the forward MOSFET.

In another aspect of the present invention, a synchronous rectifier may comprise a forward MOSFET; a forward gate driver; a catch MOSFET; a catch gate driver; and wherein an output pin of the catch gate driver is connected with a first input pin of the forward gate driver.

In still another aspect of the invention, a method of performing rectification may comprise the steps of applying a power demand signal to a PWM controller; applying output signal from the PWM controller to a driver for a forward MOSFET and a driver for a catch MOSFET; activating a catch MOSFET responsively to a low output signal from the PWM controller; and blocking activation of a forward MOSFET responsively to the low output signal so that cross conduction of the forward MOSFET and the catch MOSFET is precluded.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide for a synchronous rectification circuit in which gate voltage of a catch MOSFET is employed as feed back to a control circuit which may remove temperature and lot-to-lot related variations of timing that are caused by parasitic impedances of MOSFETS, such as gate to source capacitance. The circuit may accommodate adjusting relative timing between gate drives of catch and forward MOSFETS by changing a resistive capacitive (RC) time constant.

Figure 1:
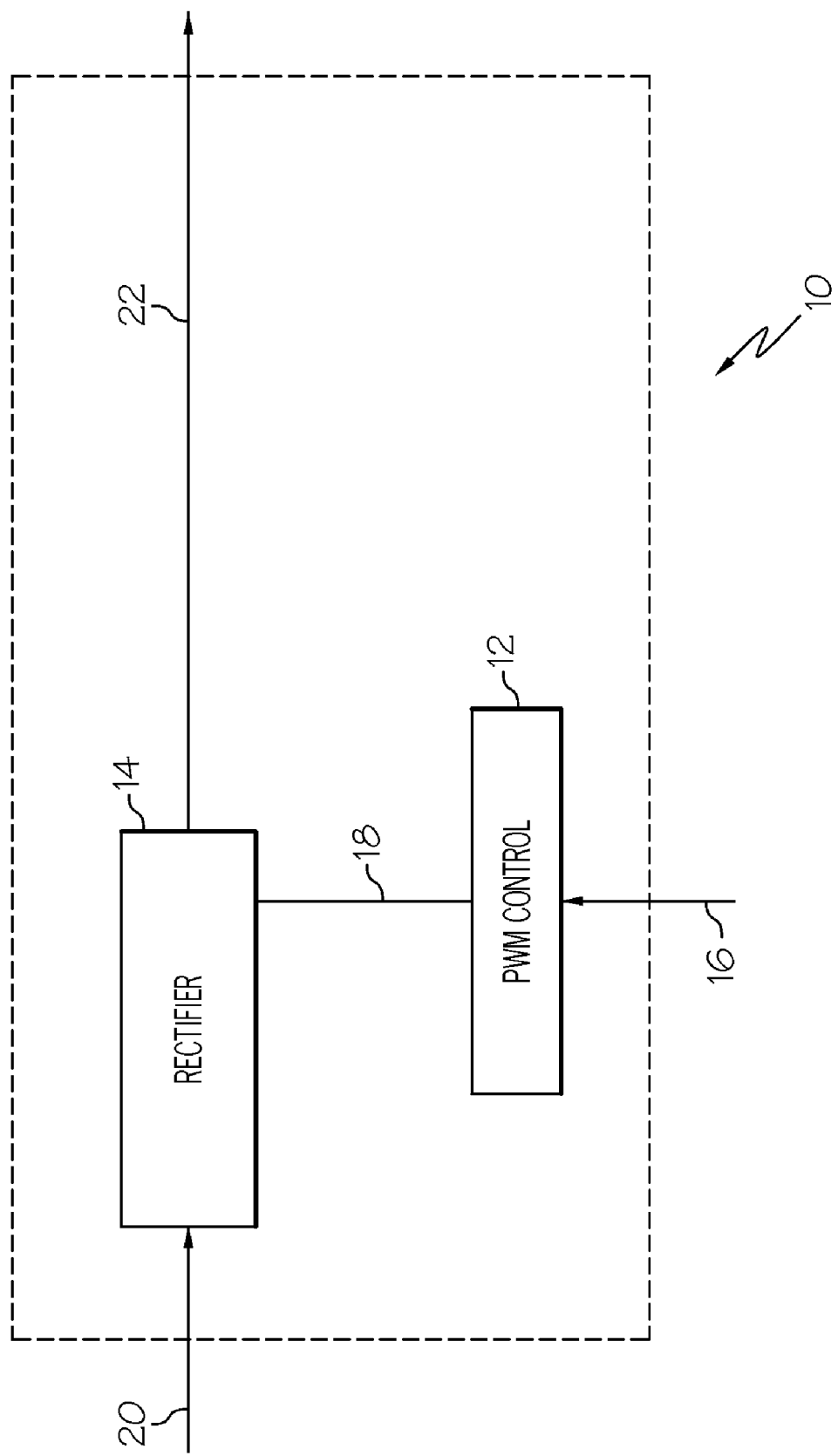
FIG. 1 is a block diagram of a power supply in accordance with an embodiment of the invention.

Referring now to FIG. 1, a power supply 10 is shown in block diagram form. The power supply 10 may comprise a pulse-width-modulation (PWM) controller 12 and a synchronous rectifier 14. In operation, a power demand signal 16 may be applied to the PWM controller 12. Responsively to the signal 16, the PWM controller 12 may provide an operating signal 18 at a desired duty cycle to the rectifier 14. The rectifier 14 may, responsively to the signal 18, rectify input current 20 into output current 22.

Figure 2:
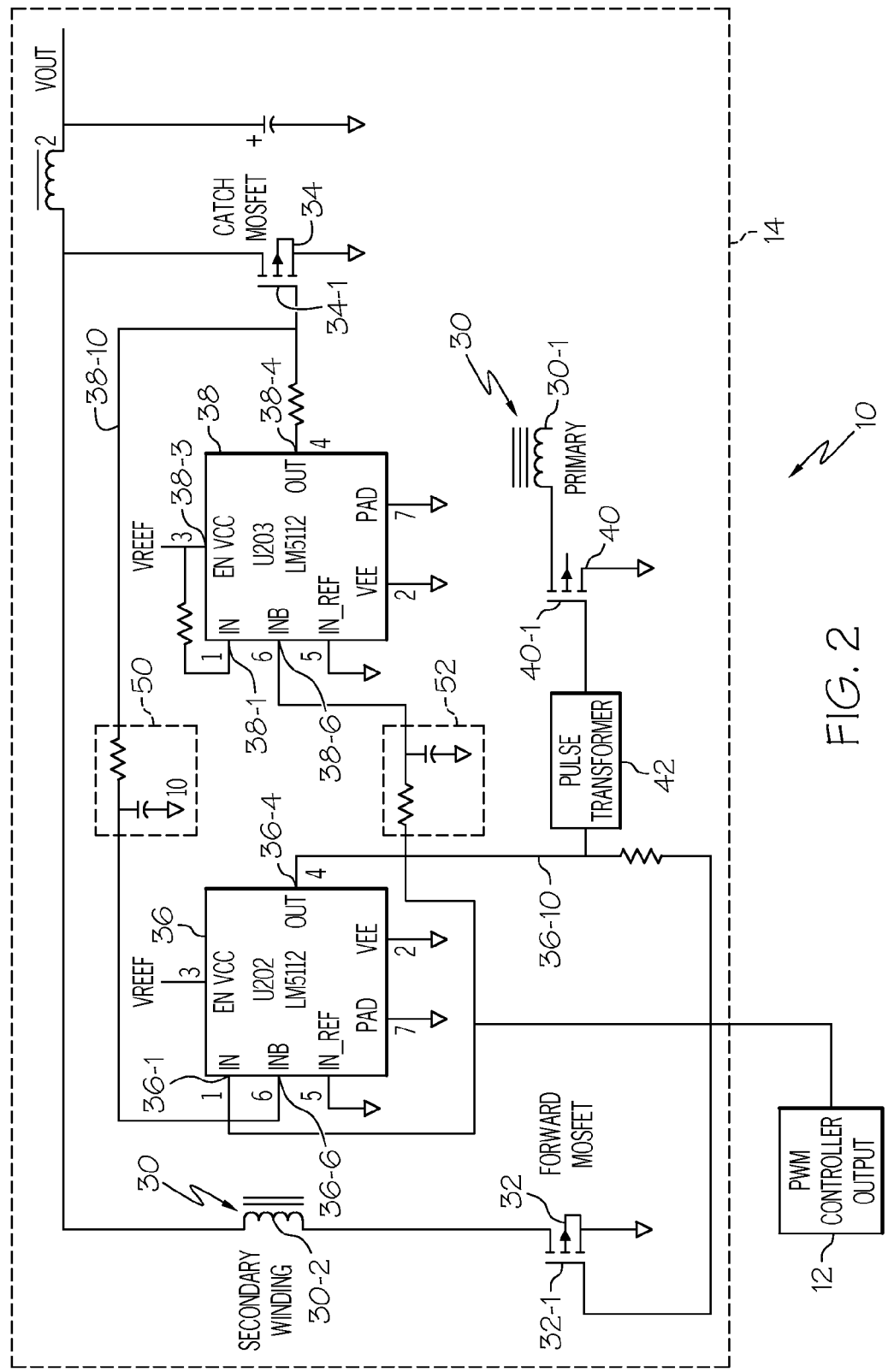
FIG. 2 is a block diagram of the power supply of FIG. 1 showing the synchronous rectifier in detail in accordance with an embodiment of the invention.

Referring now to FIG. 2, the power supply 10 is illustrated in block diagram form with the rectifier 14 shown in detail. The rectifier 14 may comprise a transformer 30, with a primary 30-1 and a secondary winding 30-2, a forward MOSFET 32 and a catch MOSFET 34. A gate 32-1 of the forward MOSFET may be connected with a forward gate driver 36. A gate 34-1 of the catch MOSFET may be connected with a catch gate driver 38.

In an exemplary embodiment of the invention, the gate drivers 36 and 38 may be commercially available gate drivers (e.g., LM5112 drivers available from National Semiconductor Corp.). The gate drivers 36 and 38 may have active high input pins 36-1 and 38-1; active low input pins 36-6 and 38-6; and output pins 36-4 and 38-4. The drivers 36 and 38 may only produce output signals 36-4 and 38-4 in the presence of high input signals at their respective inputs 36-1 and low input signals at their respective inputs 36-6 and 38-6.

The active high input pin 38-1 of the driver 38 may be maintained continuously in a high state by application of voltage from a power source (not shown) to a power input 38-3 pin. Consequently, when the PWM controller 12 produces a low one of the signals 18, the catch MOSFET 34 may operate because the driver 38 is then provided with both a low signal at its pin 38-6 and a high signal at its pin 38-1. Conversely, the forward MOSFET 32 will not operate in the presence of the low one of the signals 18, because the low signal 18 will be applied to the active high input 36-1 of the driver 36.

It may be noted that the input pin 36-6 may be interconnected with the output pin 38-4 of the driver 38. Consequently, an output signal 36-10 may be produced only during production of a low output signal 38-10 from the driver 38 and a high output signal 18 from the PWM controller 12. In other words, the output signal 36-10 may be produced only when output signal 38-10 is not produced. Thus, the gates 32-1 and 34-1 may not operate simultaneously. The MOSFETS 32 and 34 may only operate sequentially, thus precluding cross conduction.

In addition to output signal 36-10 from the driver 36 producing operation of the gate 32-1 of the forward MOSFET 32, the output signal 36-10 may also operate a gate 40-1 of a primary MOSFET 40 through a pulse transformer 42.

Figure 3:
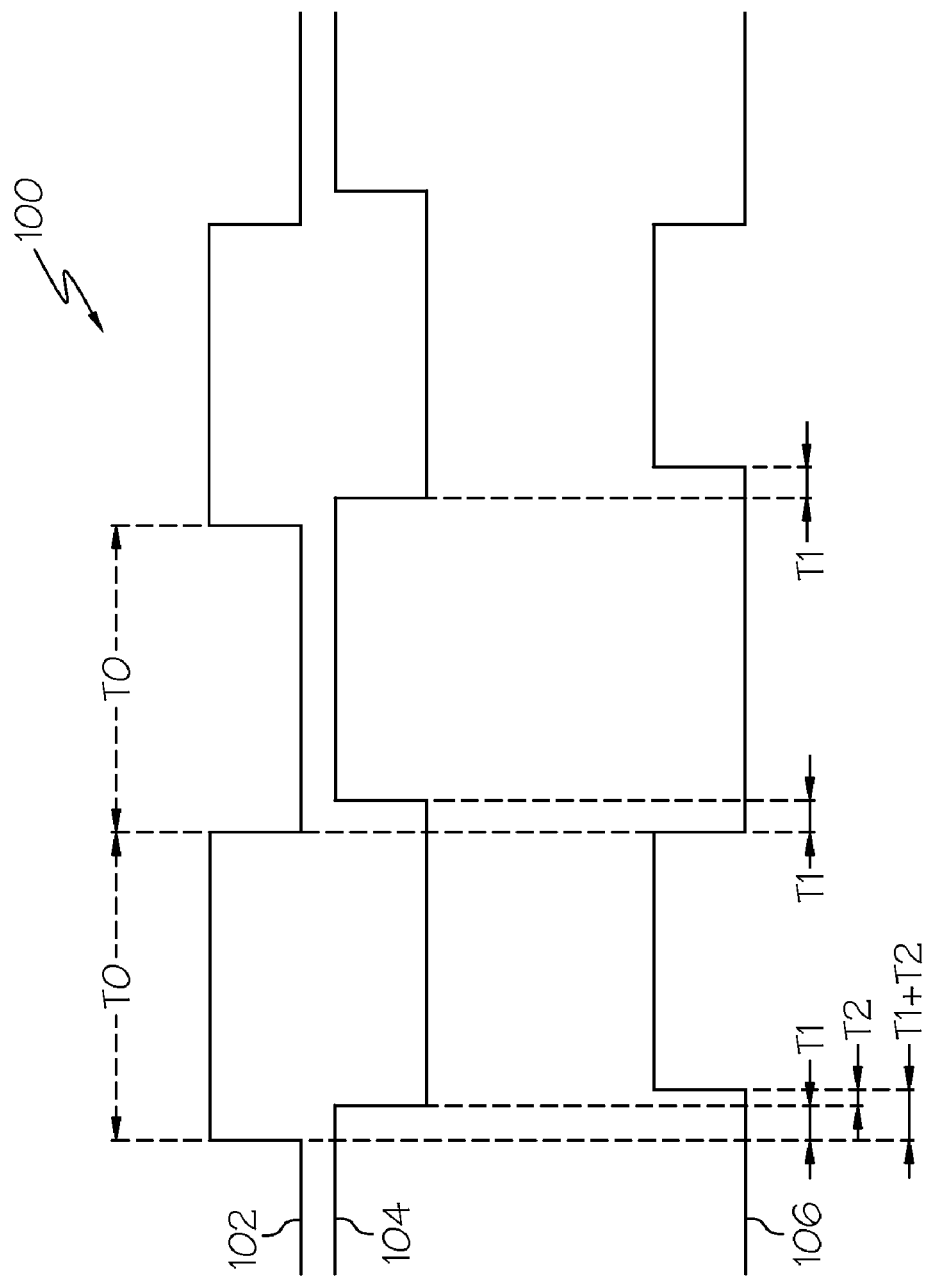
FIG. 3 is a timing diagram illustrating operation features of the power supply of Figure in accordance with an embodiment of the invention.

Referring now to FIG. 3, a timing diagram 100 may be illustrative of operating features of an exemplary embodiment of the power supply 10. In the diagram 100, a pulse sequence 102 may represent an output from the PWM controller 12; a pulse sequence 104 may represent an output from the catch gate driver 38; and a pulse sequence 106 may represent an output from the forward gate driver 36. In operation, the PWM controller 12 may produce the signals 18 in an alternating high/low sequence. A high one of the signals 18 may, after a delay T1, result in a low output from the gate driver 38. A low one of the signals 18 may, after a delay T1, result in a high output from the gate driver 38 and the catch MOSFET 34 may be activated. At a time T1+T2, after the high signal 18, the gate driver 36 may produce a high output and the forward MOSFET 34 may be activated. Simultaneously with production of a low one of the signals 18, at a time T0 after the high signal 18, the gate driver 36 may produce a low output signal and the forward MOSFET 32 may be deactivated.

Thus, the forward MOSFET 32 may be inactivated while the catch MOSFET 34 is activated. Conversely, the catch MOSFET 34 may be inactivated while the forward MOSFET 32 is activated. The catch MOSFET 34 may be activated with pulse times equal to the pulse times of the PWM controller 12, i.e., pulse time T0. In the exemplary embodiment illustrated in FIGS. 2 and 3, the forward MOSFET 32 may be activated with pulse times shorter than T0. The forward MOSFET 32 may be activated for time intervals which are a time T2 less than the time intervals of activation of the catch MOSFET 34.

This T2 time differential may be considered "dead time". It may be noted that in an exemplary embodiment of the invention, an RC circuit 50 may be interposed between the output pin 38-4 of the driver 38 and the input pin 36-6 of the driver 36. With proper selection of capacitance and resistance values, the RC circuit 50 may introduce a predetermined dead time delay i.e., the time T2, between production of output signals 38-10 at pin 38-4 and receipt of a corresponding input signal at pin 36-1.

As explained above, cross conduction may be logically precluded because of the interlocking arrangement of input and output pins of the drivers 36 and 38. However, a certain degree of unpredictability of timing may occur if triggering of the forward MOSFET 32 were to proceed merely as a function of production of an output signal from pin 36-4 of the catch MOSFET 36. In a typical MOSFET there may be a finite unpredictable time lapse between activation of its gate and initiation of current between its source and drain. It may be desirable to reduce the unpredictability by introducing a known dead time lapse between successive operations of the MOSFETS 32 and 34. The RC circuit 50 may perform this role.

The resistive and capacitive components of the RC circuit 50 may be selected from various commercial sources. It may be desirable to select these components which may have stability of resistive or capacitive value over a large range of temperature. Use of such temperature-stable components may provide the power supply 10 with temperature stable timing. Temperature stability of timing in such a power supply may be independent of temperature stability of timing of the MOSFETS 32 and 34. In other words, timing of the rectifier 14 may remain nearly constant throughout a wide range of temperature, because timing may be determined exclusively by selection of temperature stable components of the RC circuit 50.

Additionally, timing may be determined independently of lot-to-lot timing variations in MOSFETS which may be incorporated in the rectifier 14.

A second RC circuit 52 may be interposed between the PWM controller 12 and the active high input pin 36-6. The second RC circuit 52 may provide an additional mechanism for controlling timing. As is the case with the RC circuit 50, the second RC circuit 52 may advantageously be constructed with temperature stable components.

It may be seen that the rectifier 14 may be constructed and successfully operated without use of either the RC circuits 50 or 52. Also the rectifier may be operated with only the RC circuit 50 or only the second RC circuit 52 or with both of the RC circuits 50 and 52.

Figure 4:
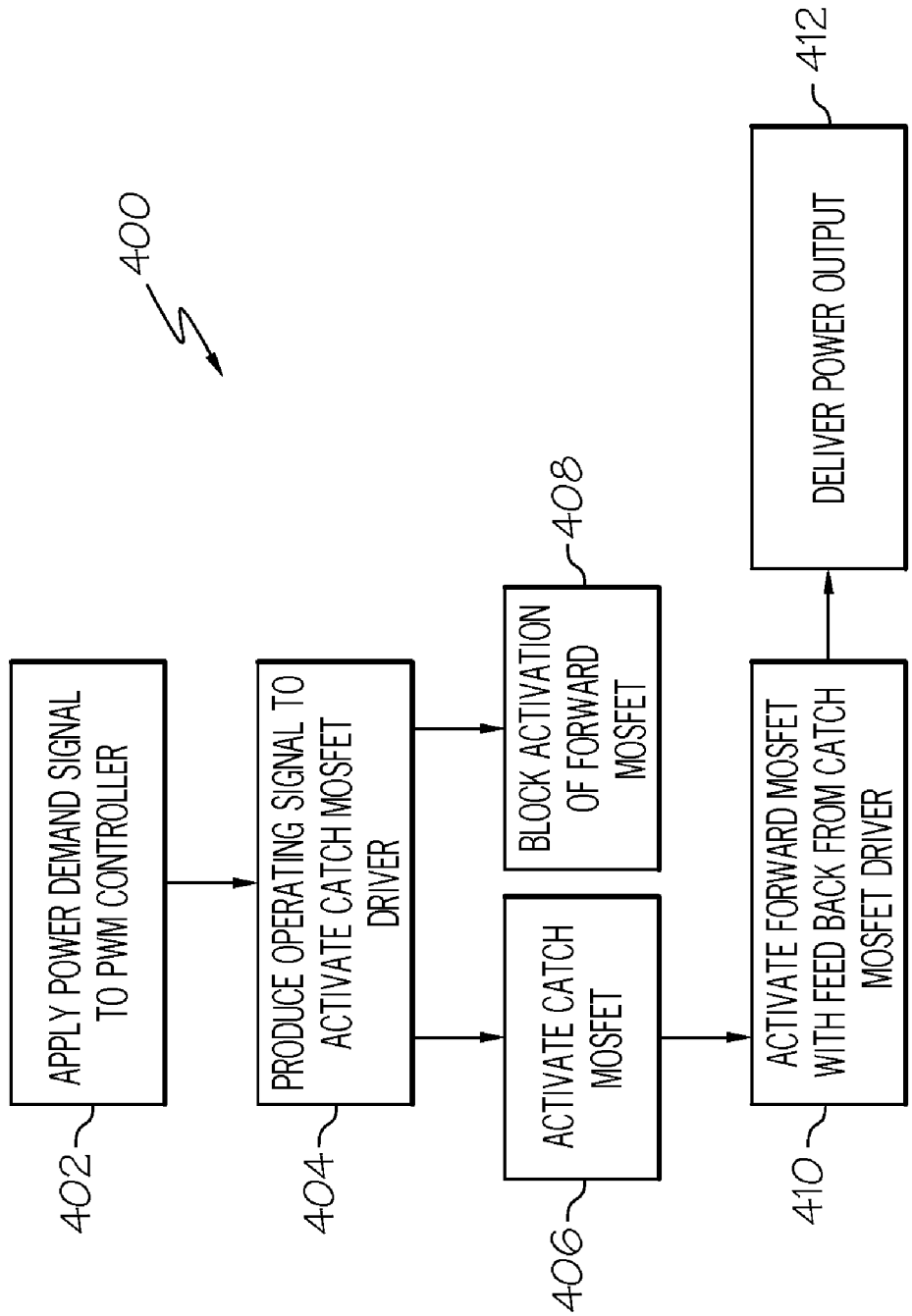
FIG. 4 is a flow chart of a method of performing rectification of power in accordance with an embodiment of the invention.

Referring now to FIG. 4, a flow chart 400 may illustrate an exemplary method which may be employed to operate the electrical power supply 10 in accordance with an embodiment the invention. In a step 402, a power demand signal may be applied to a PWM controller (e.g., the signal 16 may be applied to the PWM controller 12). In a step 404, an operating signal may be produced to activate a catch gate driver (e.g., the PWM controller 12 may produce an active low signal and apply the signal to the active low input pin 38-6 of the catch gate driver 38). In a step 406, a catch MOSFET may be activated (e.g., the catch gate driver 38 may produce an output from output pin 38-4 to operate the gate 34-1 of the catch MOSFET 34). In a step 408, performed simultaneously with step 306, activation of a forward MOSFET may be blocked (e.g., the active low signal from the PWM controller 12 may be applied to the active high input pin 36-1 of the forward gate driver 36 resulting in an absence of a high output from the forward gate driver 36). In a step 410, the forward MOSFET may be activated with feedback from the catch gate driver (e.g., an active low signal from the output pin 38-4 of the catch gate driver 38 may be applied to the active low input pin 36-6 of the forward gate driver 36).

It should be understood, of course, that the foregoing relates to exemplary embodiments of the invention and that modifications may be made without departing from the spirit and scope of the invention as set forth in the following claims.

We claim:

1. A power supply comprising:
   a pulse-width-modulation (PWM) controller;
   a synchronous rectifier having a forward metal oxide field effect transistor (MOSFET) and a catch MOSFET;
   a forward gate driver for driving a gate of the forward MOSFET;
   a catch gate driver for driving a gate of the catch MOSFET, wherein:
      a first enabled pin of the forward gate driver is configured as an active low input pin for receipt of a low operating output signal from the catch gate driver,
      a second enabled pin of the forward gate driver is configured as an active high input signal for receipt of a high operating output signal from the PWM controller,
      an enabled pin of the catch gate driver is configured as an output pin configured to drive the catch MOSFET in the presence of a low input signal from the PWM controller, and
      the active low input pin of the forward gate driver is connected to the output pin of the catch gate driver; and
   the PWM controller connected so that a low output of the PWM controller to the low signal input of the catch gate driver operates the catch MOSFET and precludes operation of the forward MOSFET.

2. The power supply of claim 1 further comprising an RC circuit interposed between the PWM controller and the catch gate driver.

3. The power supply of claim 2 wherein the PWM controller is connected to the forward gate driver without an intervening RC circuit.

4. The power supply of claim 1 further comprising a primary MOSFET wherein a MOSFET gate pin of the forward gate driver is connected to a gate of the primary MOSFET.

5. The power supply of claim 3 further comprising a pulse transformer interposed between an output pin of the forward gate driver and a gate of the primary MOSFET.

6. The power supply of claim 1 wherein an output pin of the catch gate driver is connected to an input pin of the forward gate driver.

7. A synchronous rectifier comprising:
   a forward MOSFET;
   a forward gate driver for driving a gate of the forward MOSFET;
   a catch MOSFET;
   a catch gate driver for driving a gate of the catch MOSFET wherein the catch gate driver comprises a first and a second input pin, wherein an output pin of the catch gate driver is connected with a first input pin of the forward gate driver, wherein:
      said first input pin of the catch gate driver is connected to a power source so that the first input pin of the catch gate driver is continuously maintained in a high state,
      said second input pin of the catch gate driver is connected to a PWM controller,
      the catch gate driver produces high outputs responsive to low outputs of the PWM controller, and
   an RC circuit connected to the second input pin of the catch gate driver through which outputs of the PWM controller pass, wherein the output of the PWM controller to the first input pin of the forward gate driver does not pass through said RC circuit.

8. The rectifier of claim 7 wherein the forward gate driver is connected so that it produces a high output responsive to a low output signal from the catch gate driver.

9. The rectifier of claim 7 further comprising a second RC circuit interposed between the output pin of the catch gate driver and the first input pin of the forward gate driver.

10. The rectifier of claim 7:
    wherein a second input pin of the forward gate driver is connected to the PWM controller, and
    wherein the forward gate driver produces high outputs responsively to presence of a high output signal from the PWM controller only in a presence of low outputs from the catch gate driver.

11. A method of performing rectification comprising the steps of:
    applying a power demand signal to a PWM controller;
    applying an output signal from the PWM controller to a driver for a forward MOSFET and a driver for a catch MOSFET;
    activating a catch MOSFET responsively to a low output signal from the PWM controller;
    activating a forward MOSFET responsively to a high output signal from the PWM controller;
    blocking activation of a forward MOSFET responsively to the low output signal so that cross conduction of the forward MOSFET and the catch MOSFET is precluded, wherein the steps of activating the forward MOSFET and blocking activation of the forward MOSFET comprise a step of feeding back an output signal of the driver for the catch MOSFET gate signal (net 38-10 FIG. 2) to an enable input pin of the driver for the forward MOSFET; and
    passing said output signal of the driver for the catch MOSFET through an RC circuit so that response of the forward MOSFET is delayed.

12. The method of claim 11 wherein the forward MOSFET is activated responsively to presence of a delayed low output signal from the driver for the catch MOSFET and a high output signal from the PWM controller.

* * * * *